United States Patent [19]

Nemoto

[11] Patent Number: 4,856,367
[45] Date of Patent: Aug. 15, 1989

[54] DRIVING POWER TRANSMISSION

[75] Inventor: Shusuke Nemoto, Yao, Japan

[73] Assignee: Kanzaki Kokyukoki Mfg., Co. Ltd., Japan

[21] Appl. No.: 179,650

[22] Filed: Apr. 8, 1988

[30] Foreign Application Priority Data

Apr. 15, 1987 [JP] Japan .............................. 62-57684[U]
May 19, 1987 [JP] Japan .............................. 62-75660[U]

[51] Int. Cl.⁴ ............................................ F16H 57/02
[52] U.S. Cl. ..................................... 74/606 R; 74/634; 180/337
[58] Field of Search ...................... 74/606 R, 607, 344, 74/701, 467, 740; 180/75, 80, 70.1, 75.1; 188/72.1, 72.9, 71.1; 184/6.12

[56] References Cited

U.S. PATENT DOCUMENTS

| | | |
|---|---|---|
| 1,481,385 | 1/1924 | Nilson et al. . |
| 2,791,912 | 5/1957 | Bixby . |
| 3,196,696 | 7/1965 | Ritter . |
| 3,339,662 | 9/1967 | Hanson et al. . |
| 3,494,225 | 2/1970 | Binder et al. . |
| 4,281,942 | 8/1981 | Gaeckle et al. . |
| 4,292,855 | 10/1981 | Murayama . |
| 4,304,141 | 12/1981 | Tone et al. . |
| 4,449,424 | 5/1984 | Hauser . |
| 4,513,834 | 4/1985 | Hayashi et al. . |
| 4,574,310 | 3/1986 | Miki et al. ............................ 180/75.1 |
| 4,696,365 | 3/1987 | Ishimori et al. ..................... 180/75.1 |
| 4,726,256 | 2/1988 | Kaler et al. .............................. 74/695 |
| 4,727,768 | 3/1988 | Hayashi et al. ......................... 74/701 |
| 4,756,208 | 7/1988 | Hayashi et al. ................. 180/70.1 X |
| 4,781,259 | 11/1988 | Yamaoka et al. ......................... 180/75 |
| 4,784,013 | 11/1988 | Yamaoka et al. .................. 74/606 R |
| 4,804,056 | 2/1989 | Toshikuni et al. .................. 180/70.1 |

FOREIGN PATENT DOCUMENTS

| | | | |
|---|---|---|---|
| 0221862 | 5/1987 | European Pat. Off. .............. 180/75 |
| 0121120 | 6/1985 | Japan .................................. 74/606 R |

Primary Examiner—Vinh Luong
Attorney, Agent, or Firm—Saidman, Sterne, Kessler & Goldstein

[57] ABSTRACT

A driving power transmission which is simply changeable of the axis of a counter shaft in order to facilitate a change in a reduction ratio and mountable of a gear train different in the reduction ratio and which inserts a bevel gear to be fitted onto an output shaft at the transmission unit into a mission case prior to coupling of a lower mission case thereof with an upper mission case and places the bevel gear on a mounting table so that the bevel gear can be fitted onto the output shaft only by being later inserted into the bevel gear.

3 Claims, 6 Drawing Sheets

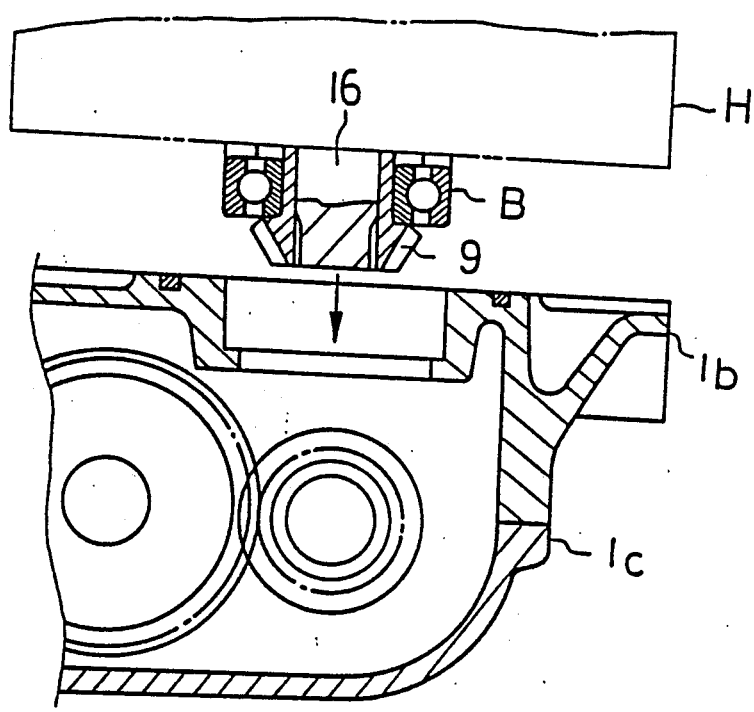
FIG·11
PRIOR ART

DRIVING POWER TRANSMISSION

SUMMARY OF THE INVENTION

A transmission case, divided into two sections at the point where the axis of a shaft supporting speed reduction gears is located, is the subject matter of Applicant's co-pending U.S. patent application Ser. No. 928,151.

For manufacturing a large or a light tractor, it is often used to change a diameter of a tire only but not other parts.

Such method is very simple and largely different in appearance, thereby being the most effective.

When the diameter of the tire is changed, the peripheral speed of the tire is different for the same driving power transmission, thereby changing the running speed. Hence, in order to compensate the running speed, it is required that exchange of the tire is anticipated to constitute a driving power transmission changeable of a reduction ratio.

The aforesaid prior application constitutes a reduction gear mechanism with a first shaft receiving a driving force from an oil pressure motor at a hydrostatic-transmission-type (HST type) transmission, in which wheel bases at the three axes are decided during the processing, so that when the reduction ratio is intended to change, each wheel base should be changed. Hence, a separate mission case must be prepared.

The present invention has been designed to solve the above problem.

In the prior application, as shown in FIG. 11 of the present invention, a bearing is fixed by shrinkage fitting means or the like to a boss of a bevel gear fitted onto an output shaft at a transmission unit and at a mission case to which other transmission unit is attached is provided with an opening of thickness and a layer diameter enough to support the bevel gear through the bearing so that the output shaft fixedly supporting the bevel gear is inserted through the opening and journaled by the bearing.

Accordingly, the assembly process for fixing the bearing to the boss at the bevel gear increases, and when the mission case has the aforesaid large thickness at the upper surface, the transmission is disposed at a high level to that extent to enlarge the entire driving power transmission and raise the input shaft thereof, whereby an engine should be disposed at a high level.

An object of the present invention is to provide a driving power transmission suitable for a compact light tractor whose transmission unit is formed at the attaching surface smaller in thickness to make the engine lower in position as much as possible by designing a mounting structure of the bevel gear fitted onto the output shaft at the transmission unit.

The above and further objects and novel features of the invention will more fully appear from the following detailed description when the same is read in connection with the accompanying drawings.

BRIEF DESCRIPTION OF THE DRAWINGS

FIG. 11 is a sectional side view of the conventional example of the driving power transmission.

DESCRIPTION OF THE PREFERRED EMBODIMENT

Figure 1:
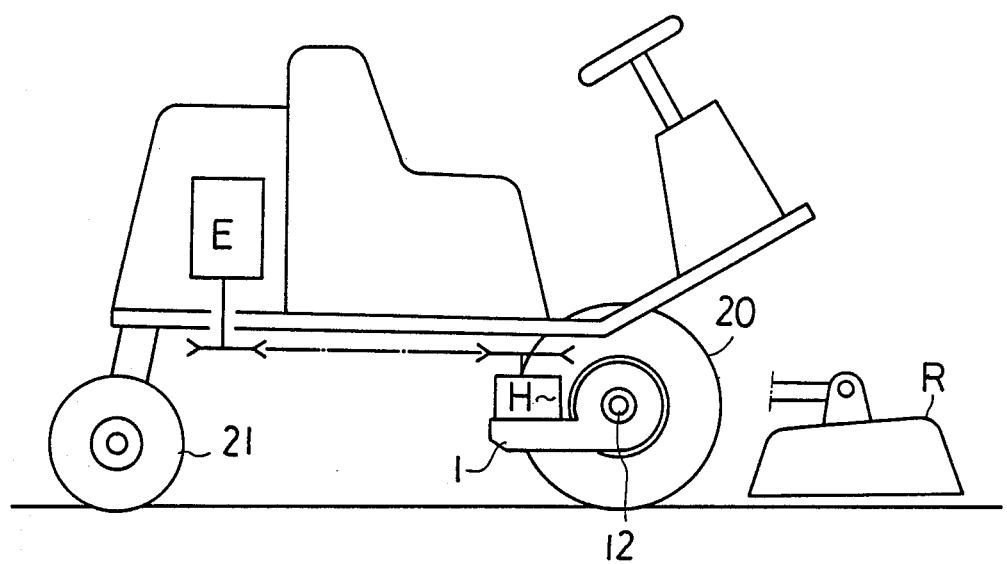
FIG. 1 is a side view of a tractor on which smaller diameter tires are put.

An object and construction of the invention are as above-mentioned. Next, explanation will be given on construction of the embodiment shown in the drawings.

Figure 2:
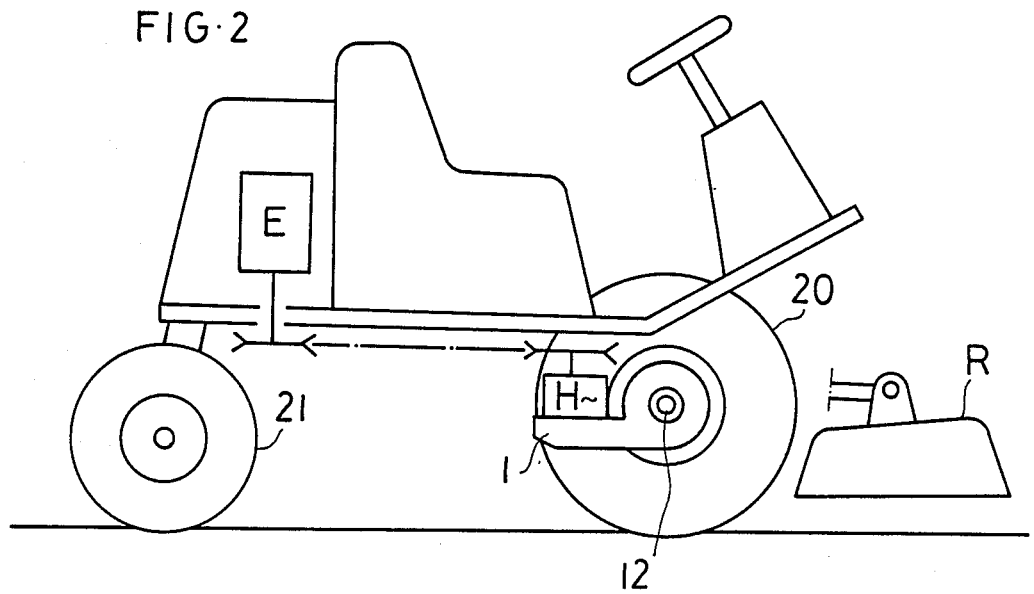
FIG. 2 is a side view of a tractor on which larger diameter tires are put.

Referring to FIGS. 1 and 2, the entire construction of the tractor will be described.

Power is transmitted through a V-belt from a crank shaft of an engine E to a transmission Unit H fixed to a mission or transmission case 1. The rotation after changing the speed is transmitted by the transmission unit H to a diff or differential gear through a reduction gear train, thereby driving therethrough lateral axles 12.

Front wheels 20 of driving wheel are fixed to the axles 12, rear wheels 21 of steering wheel being fixed to the rear of the tractor.

In the present invention, the size of tire is exchanged in order to produce various kinds of larger or light tractors.

Variation in the circumferential speed of the tire caused by a change in the size thereof is restored the original by changing a reduction ratio in the mission case 1.

In addition, a mower R is disposed in the front of the tractor.

Next, explanation will be given on the mission case 1 shown in FIGS. 3, 4, 5 and 6.

An upper mission case 1b is loaded on a lower mission case 1c and a diff case 1a is placed at an opening provided above the diff gear at the upper mission case 1b.

The driving power transmission unit H is placed on a portion of the upper mission case 1b where no diff case is loaded, and an output shaft 16 of the driving power transmission unit H projects into the mission case 1 through an insertion bore of the upper mission case 1b.

The output shaft 16 is supported by a bearing at a side of the driving power transmission unit H, no bearing is provided at an insertion bore at the upper mission case 1b side.

Therefore, at the upper mission case 1b is merely formed the insertion bore of a somewhat larger diameter than a diameter of the output shaft 16 and of the size enough to insert the output shaft 16 into the mission case 1c.

Conventionally, as shown in FIG. 11, a bevel 9 is inserted into the mission case 1c after coupling the lower mission case 1c with the upper mission case 1b. The present invention, however, disposes the bevel gear 9 in engagement with a bevel gear 8 within the mission case 1 prior to coupling of the lower mission case 1c with the upper mission case 1b, the bevel gear 9 being placed on a mounting table or mounting element 17 projecting from the lower mission case 1c.

Hence, the output shaft 16, which is inserted into the upper mission case 1b, can be fitted into a spline bore 9a at the bevel gear 9.

Figure 10:
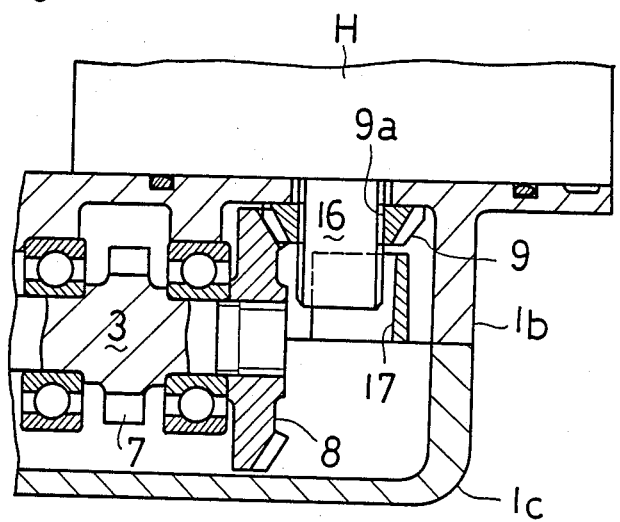
FIG. 10 is a sectional side view of a transmission unit placed on an upper mission case when an output shaft is fitted into a spline bore at the bevel gear to rotate the output shaft.

The bevel gear 9 is driven by the output shaft 16 so as to be subjected by thrust reaction to a force to float the bevel gear 9 above the mounting table 17 with respect to the bevel gear 8 as shown in FIG. 10.

The bevel gear 8 mounted on one end of a first shaft 3 and engageable with the bevel gear 9 drives the first shaft 3 to rotate a first gear 7 thereon. The first shaft 3 projects at the other end thereof into a brake chamber 1g at the lower mission case 1c and fixedly supports a brake drum 18.

Figure 5:
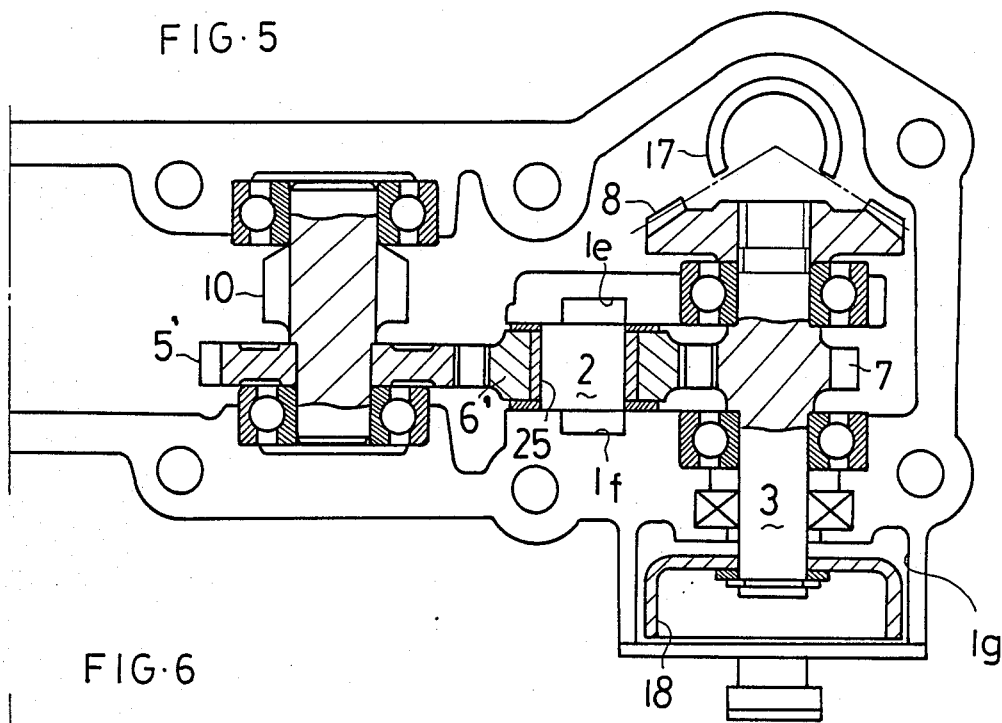
FIG. 5 is a plan view in part of the lower mission case when the counter gear uses a larger diameter gear.
Figure 6:
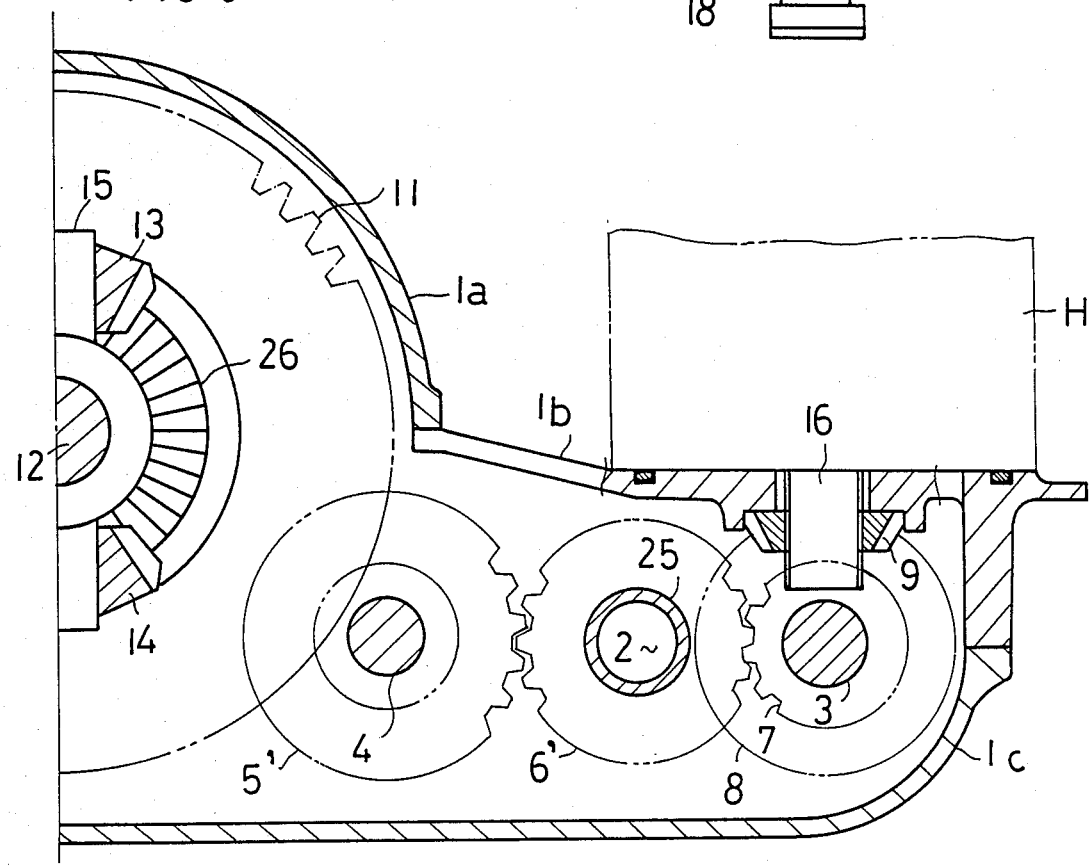
FIG. 6 is a side view of the same.

Referring to FIG. 5, a counter gear 6 is freely fitted on a counter shaft 2 through bearing metal 25 and engages with the first gear 7 and further with a larger diameter gear 5 on a third shaft 4.

A smaller diameter gear 10 thereon engages with a ring gear 11 at the diff gear unit.

The diff gear unit is so constructed that a pinion shaft support 15 is fitted into a bore formed at a boss of the ring gear 11, two pinions 13 and 14 are freely fitted on the pinion shaft support 15, and a boss thereof forms a fitting bore through which the lateral axes 12 abut against each other and further forms a positioning portion at the inside of each lateral diff side gear 26.

In the above-mentioned constitution, the present invention is directed to shifting of the counter shaft 2 so as to change diameters of the counter gear 6 and larger diameter gear 5 to cope with variation in the tire diameter.

Figure 7:
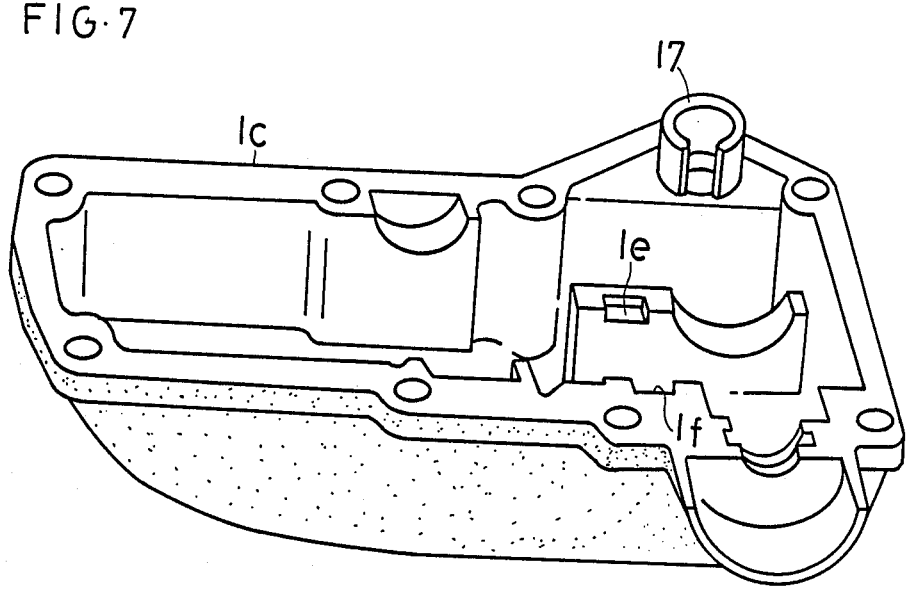
FIG. 7 is a perspective view of the lower mission case.
Figure 8:
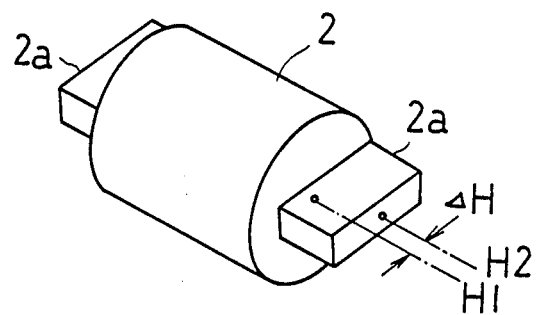
FIG. 8 is a perspective view of a counter shaft.
Figure 9:
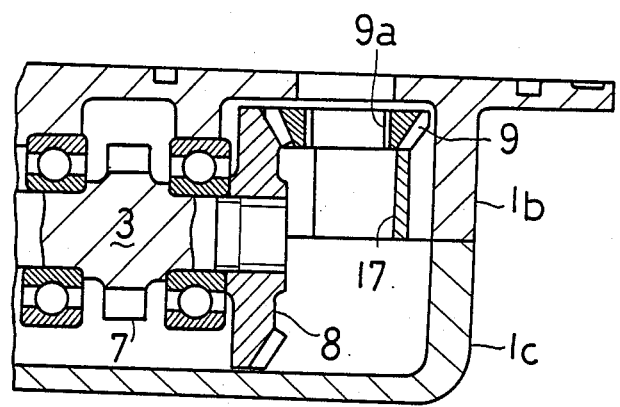
FIG. 9 is a sectional side view of the state where a bevel gear is placed on a mounting table.

Namely, the lower mission case 1c and counter shaft 2 are formed in configuration shown in FIGS. 7 and 8.

Generally, the counter shaft 2 is rotatably supported at the shaft into a round shaft bore in the state where it is fitted into the bearing metal.

On the contrary, in the present invention, the counter shaft 2, which is round in section, is not supported directly by the bearing metal but supported in such a manner that fixedly retaining portions 2a each are formed in a rectangular parallelepiped easy to machine and disposed to put the center or central axis H2 thereof at the position eccentric only by eccentricity ΔH from the axis H1 of counter shaft 2 and fitted into retaining recesses or grooves 1e and 1f provided at the lower mission case 1c and an intermediate mission case 1b, thereby not-rotatably supporting the counter shaft 2.

Bearing metal 25 is coated on the counter shaft 2 and the counter gear 6 is rotatably supported thereon.

Figure 3:
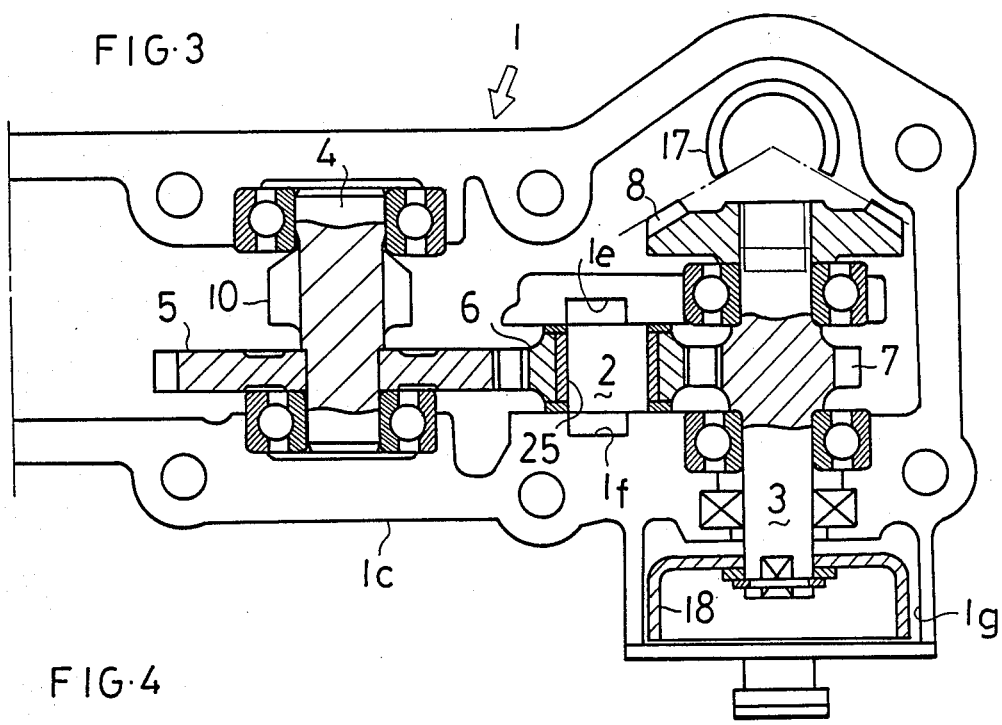
FIG. 3 is a plan view in part of a lower mission case when a counter gear uses a smaller diameter gear.
Figure 4:
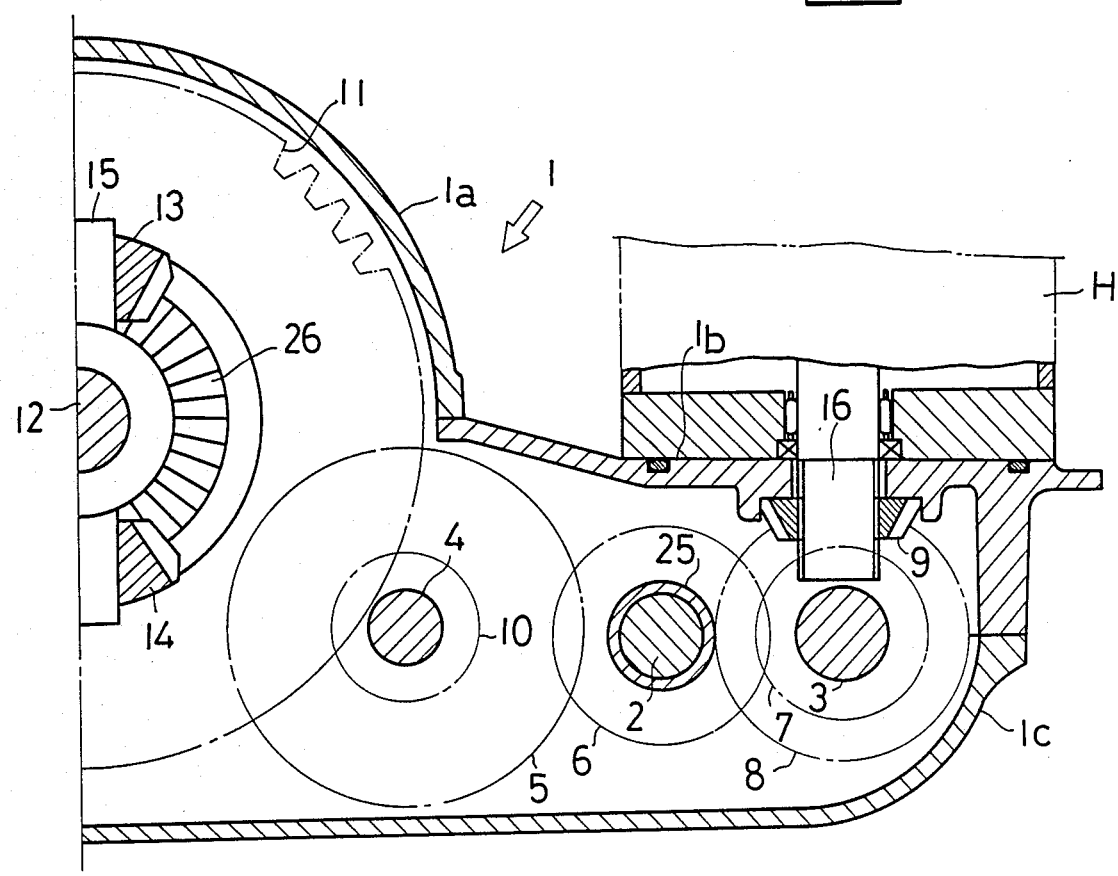
FIG. 4 is a side view of the same.

Since the center H2 of the fixedly retaining portions 2a shifts only by the eccentricity ΔH from the axis of counter shaft 2, the counter shaft 2, when disposed as shown in FIG. 3, approaches the first shaft 3 only by the eccentricity ΔH, whereby the counter gear 6 can use a smaller diameter gear and contrary the larger diameter gear 5 can use a larger diameter gear, thereby increasing the reduction ratio.

Also, in a case that the fixedly retaining portions 2a are turned over and the counter shaft 2 is disposed as shown in FIG. 5, the axis is changed in position and the counter shaft 2 moves away from the first shaft 3 by the eccentricity ΔH, whereby it is possible to change the counter gear 6 to a larger diameter one 6' and contrary the larger diameter gear 5 to a slightly smaller diameter gear, so that the reduction ratio is reduced in comparison with the state in FIG. 3.

Thus, the fixedly retaining portions 2a at the counter shaft 2 are turned over, whereby one mission case, even when in use, can obtain two kinds of reduction ratios.

In this embodiment, the first gear 7 on the first shaft 3 is equal in diameter and used in common. Alternatively, the counter gear 6 and first gear 7 may change in diameter so that the larger diameter gear 5 may be used in common.

The present invention constructed as above-mentioned has the following effects.

Firstly, since the fixedly retaining portions 2a at the counter shaft 2 are turned over to enable the wheel base from the first shaft 3 to the counter shaft 2 and that therefrom to the third shaft 4 to be simply changed, when the reduction ratio is changed at the steering speed change unit side to correspond to a change in specification of the tire diameter, one mission case is usable in common.

Secondly, since the mission case 1 is divided into the upper mission case 1b above the axis of counter shaft 2 and the lower mission case 1c under the same, the reduction ratio, when changed, largely facilitates its assembly and reassembly works.

Thirdly, the counter shaft 2, fixedly retaining portions 2a and retaining grooves 1e and 1f at the mission case 1 are simple in configuration, thereby being inexpensive to produce.

Fourthly, since the mission case 1 can be reduced in vertical width, the transmission unit is lowered at the mounting position so that the entire driving power transmission can be made compact, thereby being suitable for the light tractor.

Although several embodiments have been described, they are merely exemplary of the invention and not to be constructed as limiting, the invention being defined solely by the appended claims.

What is claimed is:

1. A driving power transmission adapted for use with a tractor having a variety of tire diameters, comprising:
    a transmission case, having an inside surface;
    a plurality of shafts within said case;
    each shaft being provided with at least one speed reduction gear;
    one of said shafts comprising a counter-shaft;
    said counter-shaft having a longitudinal axis;
    at least one axial end of said counter shaft being provided with a retaining portion for retaining said counter shaft within said case;
    said retaining portion having a central axis, wherein said axis of said counter-shaft is eccentric to said central axis of said retaining portion;
    said case being provided, at the inside surface thereof, with at least one retaining groove for receiving the retaining portion of said counter-shaft.

2. A driving power transmission, as recited in claim 1, wherein said retaining portion is rectangular parallelepiped.

3. A driving power transmission as recited in claim 1, further comprising:
    a hydro-static transmission;
    an output shaft extending from said hydro-static transmission into said transmission case;
    a first bevel gear, provided on said output shaft at the interior of said transmission case;
    a second bevel gear provided on one of said shafts, which engages said first bevel gear; and
    a mounting element, projecting from the inside surface of said case, for supporting said first bevel gear during assembly of said driving power transmission.

* * * * *